INVENTOR.
William H. Dumbaugh, Jr.

3,404,015
LOW THERMAL EXPANSION GLASSES
William H. Dumbaugh, Jr., Corning, N.Y., assignor to Corning Glass Works, Corning, N.Y., a corporation of New York
Filed Apr. 28, 1965, Ser. No. 451,517
7 Claims. (Cl. 106—52)

This invention relates to low thermal expansion glass compositions based on a magnesium oxide-aluminum oxide-silica system. In one specific aspect it relates to a composition for making low thermal expansion telescope mirror disks.

One of the great achievements in the use of glass has been in the making of the glass mirror disk for the 200 inch reflecting telescope at Mount Palomar. In designing an astronomical mirror it is important to determine what effect temperature changes will have on it. The surface of the mirror is so finely focused to the light of the stars that even the slightest distortion caused by expansion or contraction of the mirror body may render the mirror temporarily useless. It is known that thick pieces of glass do not respond evenly to heating and cooling. As the glass begins to cool from the heat of day, complicated strains are produced in the glass which distort the face of the mirror from its true curvature such that proper focusing of images on the telescope may then be impossible.

Heretofore, low expansion glasses have been successfully used in the manufacture of telescope mirrors. These glasses are very nearly insensitive to temperature changes. Well-known low thermal expansion glasses are certain borosilicate glasses sold commercially by the Corning Glass Works under the trademark Pyrex brand glass. Some of these, such as for example, glass Code 7740, have been widely and successfully used for laboratory ware and cooking utensils subjected to rapid changes in temperature. Another borosilicate glass composition similar to Pyrex brand glass is sold commercially under the trademark Duran 50.

The glass composition used in making the disk for the Mount Palomar telescope was a special low expansion glass described in the Hood patent U.S. 2,106,526. This glass, designated as glass Code 7160, has a very low thermal coefficient of expansion of $24.5 \times 10^{-7}$ per degree C., a high chemical stability and sufficient surface hardness. While this glass is of a special composition designed for a special purpose, the process of making large disks from the composition is extremely complicated and it is impossible to make such disks by ordinary means. One great difficulty involves the fact that the glass composition has an extremely high viscosity.

Unfortunately, making borosilicate glasses of high optical quality is also extremely difficult. Numerous cords and striae are found in regular melts of borosilicate glasses and these generally do not meet optical standards. In addition the borosilicate glasses tend to phase separate and require a carefully controlled annealing schedule. It would be desirable to improve the glass quality by melting the glass composition in a continuous glass furnace used to make optical glass, such as described by C. J. Phillips in "Glass Its Industrial Applications," 182, Reinhold, New York, 1960. This furnace contains a platinum lined finer to minimize stones, bubbles and striae. However, at a melting temperature of 1500–1550° C. the viscosity of the borosilicate glasses generally is too high to obtain homogeneous compositions.

Quite surprisingly, I have discovered a novel glass composition which has the excellent properties of the borosilicate glasses and in addition can be melted in a continuous glass furnace for melting optical glass. The composition is based on a magnesium oxide-aluminum oxide-silica system. Glasses made according to the present invention have a low thermal expansion coefficient, are capable of being melted in an optical unit, have no phase separation, and have good acid durability.

It is therefore an object of the present invention to provide a glass composition capable of being molded into a low thermal expansion telescope mirror disk.

It is a further object of the present invention to provide a low expansion glass composition capable of being melted in a standard continuous glass furnace for making optical glass.

In accordance with the present invention I have discovered a low thermal expansion glass composition consisting essentially on the oxide basis of magnesium oxide 6–12 mole percent, aluminum oxide 8–18 mole percent, silica 64–70 mole percent, alkali metal oxide 0.5–3 mole percent and a member selected from a group consisting of antimony trioxide and tantalum oxide 1–3 mole percent. The composition may additionally also contain boric oxide 0–5 mole percent, and zinc oxide 0–5 mole percent.

Silica, in addition to its customary role as a network former, when present in large amounts imparts to the glass a low thermal expansion. It is necessary that the amount of silica be high in the range of 64–70 mole percent. When the amount of silica falls below 64 percent the thermal expansion of the glass becomes too high for the intended use and the chemical durability decreases. While it is desirable that the silica content be as high as possible, above 70 percent the viscosity of the glass composition becomes too high for melting in an optical glassmaking furnace to produce a glass of high quality.

The amount of alumina present in the composition is closely related to the silica content. Generally, the total amount of alumina and silica present should be in the range of 75–85 mole percent. Considered separately, the amount of alumina should be in the range of 8–18 mole percent. When less than 8 percent of alumina is present, the amount of silica would have to be increased resulting in a glass which is very hard to melt; on the other hand, the liquidus of the glass becomes too high and the glass becomes unstable when the alumina content is greater than 18 mole percent. Small amounts of boric oxide from 0–5 mole percent may be present in the composition as a flux, however, large amounts of boric oxides must be avoided since it decreases the slope of the viscosity temperature curve and tends to produce a phase separation upon heating.

The primary modifier used in the composition of the present invention is magnesium oxide. An amount of 6–16 mole percent of magnesium oxide should be present in the glass composition. The viscosity of the composition becomes too high for melting good quality glass when the amount of magnesium oxide falls below 6 mole percent, whereas above 16 mole percent of magnesium oxide undesirably increases the thermal expansion. Other alkaline earth metal oxides cannot be substituted on a mole for mole basis for magnesium oxide since these tend to raise the expansion coefficient. Another modifier, which can be added in small amounts, is zinc oxide which may be present in an amount of 0–5 mole percent. However, large amounts of zinc oxide should be avoided since it tends to undesirably raise the viscosity of the melt.

A very limited amount of alkali metal oxides, preferably lithium oxide, should be used. It is necessary that 0.5 mole percent be present in the composition to inhibit phase separation and to help improve meltability by lowering the viscosity. More than 3 percent should be avoided since the thermal expansion becomes too high.

The presence of antimony trioxide and/or tantalum oxide is very important in the composition of the present invention. These should be present in amounts ranging from about 1–3 mole percent, corresponding in weight to about 4–12 percent, to achieve the proper combination of expansion, viscosity, chemical durability, and thermal stability. At least one mole percent must be present, but over three mole percent raises the thermal expansion undesirably. While very small amounts of antimony trioxide have been used as fining agents, such a large antimony trioxide content is uncommon in commercial glasses. Replacing the antimony trioxide partially or completely with arsenic trioxide and arsenic pentoxide were tried. Unfortunately, these melts frothed excessively and a scum was formed on the surface of the melt. The quality of the arsenic substituted glass was also poor due to the presence of cords and seeds.

For the purposes of the present invention, the thermal expansion is defined as the coefficient of linear expansion which is the ratio of change in length per degree C. to the length at 0° C. The value of the coefficient varies with temperature and may be illustrated by the equation:

$$l_t = l_0(1 + \alpha t)$$

wherein $t$ is the temperature in degrees C., $l_t$ is the length at temperature $t$, $l_0$ is the length at 0° C. and $\alpha$ is the coefficient of linear expansion. The coefficient of linear expansion of the glasses prepared according to the present invention should be no greater than about $30 \times 10^{-7}$ per degree C. over the range 0–300° C.

The preferred composition of the applicant's invention is set forth in the table below. The ingredients are given in terms of the corresponding oxides.

TABLE I.—PREFERRED COMPOSITION

| Oxide | Mole Percent | Weight Percent |
|---|---|---|
| $SiO_2$ | 68 | 59.38 |
| $Al_2O_3$ | 12 | 17.78 |
| $B_2O_3$ | 4 | 4.06 |
| $MgO$ | 8 | 4.70 |
| $ZnO$ | 4 | 4.74 |
| $Li_2O$ | 2 | 0.87 |
| $Sb_2O_3$ | 2 | 8.48 |

The accompanying drawing illustrates the improvement in the glass composition prepared according to the present invention in which.

The compositions of low expansion prior art glasses used for purposes of comparison are shown in the table below and are given in weight percent on the oxide basis.

TABLE II.—COMPOSITION

| Ingredient | 7160 | 7740 | Duran 50 |
|---|---|---|---|
| $SiO_2$ | 81.0 | 80.27 | 79.69 |
| $B_2O_3$ | 16.5 | 12.23 | 10.29 |
| $Al_2O_3$ | 0.9 | 2.79 | 3.10 |
| $Na_2O$ | 1.3 | 3.97 | 5.20 |
| $K_2O$ | | 0.40 | |
| $Li_2O$ | 0.3 | | |
| $CaO$ | | 0.80 | 0.77 |
| $MgO$ | | | 0.87 |

Figure 1:
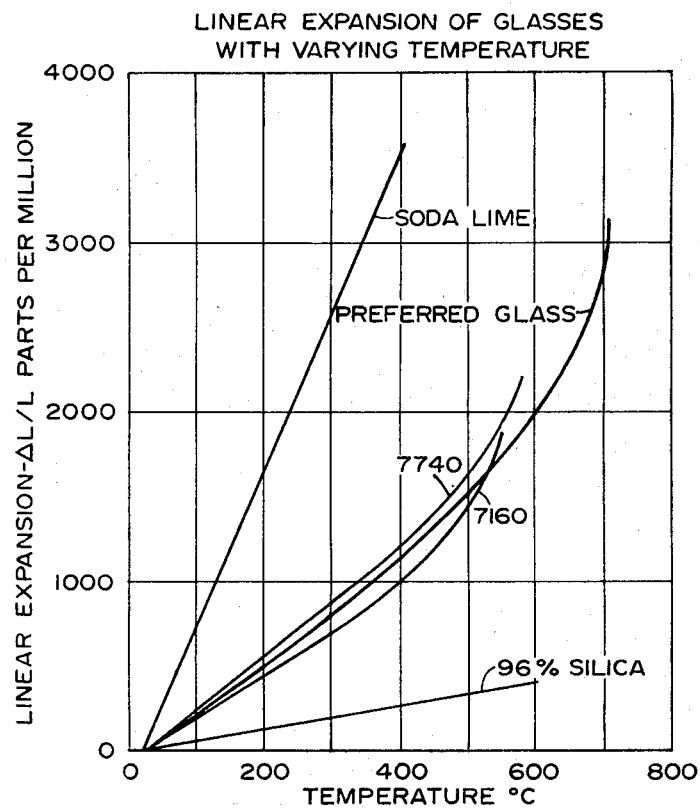
FIGURE 1 shows a comparison of the thermal coefficient of expansion at various temperatures of the preferred glass prepared according to the present invention and certain prior art glasses.

Referring to FIGURE 1, the thermal expansion of the low expansion glasses lies between an extremely low expansion 96 percent silica glass (Vycor glass) and a high expansion soda lime glass (Code 0080 glass). It can readily be observed that the preferred glass composition shows improvement in expansion characteristics over Code 7740 glass composition.

Figure 2:
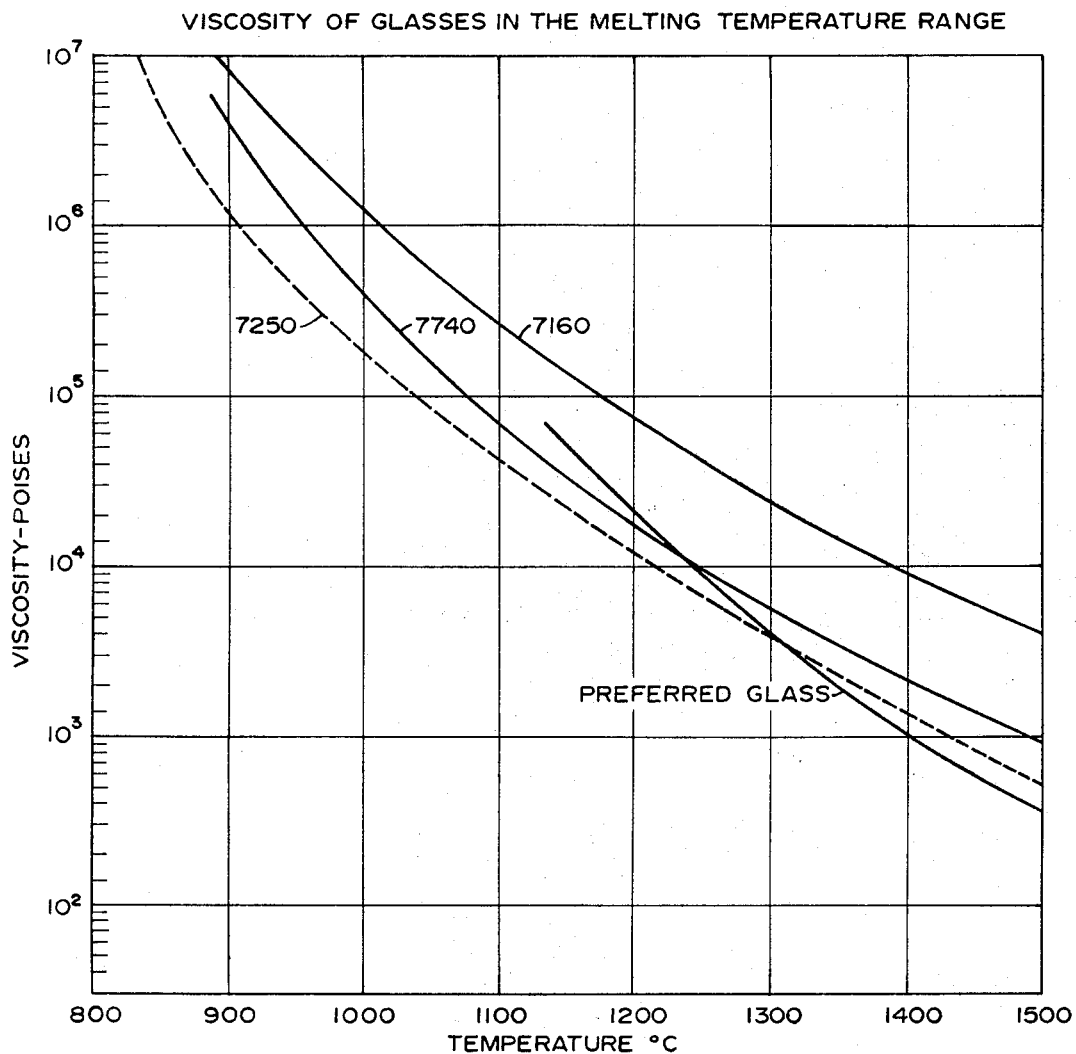
FIGURE 2 shows a comparison of the viscosity at various temperatures of the preferred glass composition and certain prior art glass compositions.

Referring to FIGURE 2, the viscosities at various temperatures of the preferred glass is compared to low expansion Pyrex glasses.

| Code: | Expansion coefficient (0–300° C.), per ° C. |
|---|---|
| 7160 | $24.5 \times 10^{-7}$ |
| 7740 | $32 \times 10^{-7}$ |
| 7250 | $36 \times 10^{-7}$ |

The curves of these borosilicate glasses indicate that at the same temperatures as the viscosities of the compositions decrease, the expansion coefficients correspondingly increase. Only Code 7250 of the borosilicate glasses shown has a viscosity low enough in the melting range of about 1500° C. to be capable of being melted in an optical furnace. The curve of the preferred glass, however, has a much greater slope than the borosilicate glasses, and intersects both the curves of Code 7740 glass and Code 7250 glass. In the melting temperature range, the preferred glass is even less viscous than Code 7250 glass indicating that the preferred glass can be melted in an optical furnace.

My invention is further illustrated by the following examples:

EXAMPLE I

The preferred glass composition of the present invention was prepared and melted from the following formulation:

TABLE III

| Batch material: | Weight (grams) |
|---|---|
| Morgan 200 mesh sand | 178.14 |
| Alumina hydrate | 89.14 |
| Boric acid | 28.87 |
| Magnesium nitrate | 59.87 |
| Magnesium oxide | 9.57 |
| Zinc oxide | 18.96 |
| Martinsburg petalite | 76.32 |
| Antimony trioxide | 33.92 |

The melting was performed in a platinum crucible at a temperature of 1550° C. for four hours. The glass was then cast into disks having a diameter of eight inches and a thickness of four inches. Under these conditions the glass was clear, very slightly seedy, and contained some cords. The melt was cooled from 1060° to 825° C. in about four hours and then to below the strain point at 10–20° per hour. The disk was annealed by heating to a temperature of 680° C. at 8° C. per hour, soaking at 680° C. for 20 hours, cooling at 3° C. per day to 540° C., and cooling to room temperature at 8° C. per hour. No evidence of phase separation was observed in the mass of the glass after the cooling schedule.

The glass composition was then tested using standard techniques to determine its characteristics. The properties of the preferred glass are set forth in the table below and are compared to the commercial low expansion glasses discussed above.

TABLE IV.—PROPERTIES OF TELESCOPE DISK GLASSES

| | Preferred | Code 7160 | Duran 50 |
|---|---|---|---|
| Expansion Coefficient (25°–300° C.) $\times 10^{-7}/°$ C. | 29 | 25 | 32.9 |
| Working Point, ° C. | 1,235 | 1,385 | 1,245 |
| Softening Point, ° C. | *850 | 830 | 815 |
| Annealing Point, ° C. | 681 | 544 | 568 |
| Strain Point, ° C. | 629 | 497 | 510 |
| Density, g./cm.³ | 2.54 | 2.16 | 2.25 |
| Liquidus, ° C. | 1,328 | 924 | |
| Viscosity at Liquidus, poises | $2.6 \times 10^3$ | $4.5 \times 10^6$ | |
| Young's Modulus, $\times 10^{-6}$ p.s.i. | 11.9 | 8.0 | 9.0 |
| Poisson's Ratio | 0.22 | 0.20 | |
| Refractive Index: | | | |
| 5893A | 1.543 | 1.477 | |
| 4861A | 1.549 | | |
| 6563A | 1.539 | | |
| Nu Value | 55.5 | | |
| Birefringence Constant, mu/cm./kg./mm.² | 285 | 430 | |

*Approximate.

Further tests were performed to determine the chemical durability of the glass composition. These tests indicate that the preferred glass composition is substantially as good as or better than the glass compositions used heretofore in to melt. The glass compositions are set forth in the table below wherein the percents are given on the oxide basis:

GLASS COMPOSITIONS

|  | Ex. II | | Ex. III | | Ex. IV | | Ex. V | | Ex. VI | | Ex. VII | |
|---|---|---|---|---|---|---|---|---|---|---|---|---|
|  | Mole percent | Weight percent | Mole percent | Weight percent | Mole percent | Weight percent | Mole percent | Weight percent | Mole percent | Weight percent | Mole percent | Weight percent |
| $SiO_2$ | 68 | 62.8 | 68 | 61.1 | 68 | 60.2 | 68 | 59.4 | 68 | 58.6 | 68 | 57.8 |
| $Al_2O_3$ | 14 | 22.0 | 13 | 19.8 | 12.5 | 18.8 | 12 | 17.8 | 11.5 | 16.8 | 11 | 15.9 |
| MgO | 8 | 5.0 | 8 | 4.8 | 8 | 4.8 | 8 | 4.7 | 8 | 4.6 | 8 | 4.6 |
| $B_2O_3$ | 4 | 4.3 | 4 | 4.2 | 4 | 4.1 | 4 | 4.1 | 4 | 4.0 | 4 | 3.9 |
| ZnO | 4 | 5.0 | 4 | 4.9 | 4 | 4.8 | 4 | 4.7 | 4 | 4.7 | 4 | 4.6 |
| $Li_2O$ | 2 | 0.9 | 2 | 0.9 | 2 | 0.9 | 2 | 0.9 | 2 | 0.9 | 2 | 0.9 |
| $Sb_2O_3$ | 0 | | 1 | 4.3 | 1.5 | 6.4 | 2 | 8.5 | 2.5 | 10.3 | 3 | 12.2 |
| Expansion coefficient (25°–300° C.) $\times 10^{-7}$/° C | | 29.7 | | 28.5 | | 28.4 | | 28.6 | | 30.6 | | 30 |
| Annealing Point, ° C | | 724 | | 710 | | 700 | | 681 | | 681 | | 671 |
| Strain Point, ° C | | 676 | | 634 | | 651 | | 629 | | 635 | | 623 |
| Liquidus, ° C | | 1,405 | | 1,355 | | 1,315 | | 1,328 | | 1,324 | | 1,320 |
| Plate Durability, 5% HCl, 24 hrs., 95° C., wt. loss (mg./cm.²) | | 4.82 | | 1.19 | | 0.94 | | 0.69 | | 0.79 | | 0.64 | the property of resistance to chemical reagents. The table below shows the results obtained.

TABLE V.—CHEMICAL DURABILITY OF DISK GLASSES
A. Polished Plate Test

| Glass | Reagent | Temp., ° C. | Time, hrs. | Wt. Loss mg./cm. |
|---|---|---|---|---|
| Preferred | 5% HCl soln | 95 | 24 | 0.68 |
| Code 7160 | 5% HCl soln | 95 | 24 | 0.01 |
| Duran 50 | 5% HCl soln | 95 | 24 | 1.06 |
| Preferred | 5% NaOH | 95 | 6 | 1.86 |
| Code 7160 | 5% NaOH | 95 | 6 | 2.0 |
| Duran 50 | 5% NaOH | 95 | 6 | 5.36 |
| Preferred | N/50 $Na_2CO_3$ | 95 | 6 | 0.07 |
| Code 7160 | N/50 $Na_2CO_3$ | 95 | 6 | 0.33 |
| Duran 50 | 0.02 N $Na_2CO_3$ | 95 | 6 | 2.49 |

B. Powder Tests

| Glass | Reagent | Temp., ° C | Time, hrs. | Percent Alkali leached Out (as percent $Na_2O$) |
|---|---|---|---|---|
| Preferred | 0.02 N $H_2SO_4$ | 90 | 4 | 0.023 |
| Duran 50 | 0.02 N $H_2SO_4$ | 90 | 4 | 0.30 |
| Preferred | $H_2O$ | 90 | 4 | 0.0005 |
| Duran 50 | $H_2O$ | 90 | 4 | 0.059 |

EXAMPLES II–VII

Following the procedure of Example I, a series of glasses were prepared in which the amount of antimony oxide was increased from zero to three mole percent with a corresponding decrease in the amount of aluminum oxide. The results indicated that in the absence of antimony oxide the glass product has poor durability, has a high liquidus, tends to phase separate, and is more difficult

I claim:
1. A low thermal expansion glass composition, having a maximum coefficient of thermal expansion of about $30 \times 10^{-7}$ per degree C., consisting essentially on the oxide basis of magnesium oxide 6–12 mole percent, aluminum oxide 8–18 mole percent, silica 64–70 mole percent, alkali metal oxide 0.5–3 mole percent and antimony trioxide oxide 1–3 mole percent.
2. The composition of claim 1, containing boric oxide 0–5 mole percent.
3. The composition of claim 1, containing zinc oxide 0–5 mole percent.
4. The composition of claim 1, wherein the total amount of silica and aluminum oxide are in the range of 75–85 mole percent.
5. The composition of claim 2, containing zinc oxide 0–5 mole percent.
6. The composition of claim 1, wherein said alkali metal oxide is lithium oxide.
7. A low thermal expansion glass composition consisting essentially on the oxide basis of magnesium oxide 8 mole percent, aluminum oxide 12 mole percent, silica 68 mole percent, boric oxide 4 mole percent, zinc oxide 4 mole percent, lithium oxide 2 mole percent, and antimony trioxide 2 mole percent.

References Cited

UNITED STATES PATENTS 3,275,493   9/1966   McDowell _____ 106—39 X
3,282,711   11/1966   Lin _____ 106—39

HELEN M. McCARTHY, *Primary Examiner.*

W. R. SATTERFIELD, *Assistant Examiner.*